United States Patent Office 2,694,679
Patented Nov. 16, 1954

2,694,679

PREPARING VITAMIN B$_{12}$ ANALOGS

Arnold J. Holland, Penn Laird, Va., and George E. Boxer, Westfield, and James C. Rickards, Rahway, N. J., assignors to Merck & Co., Inc., Rahway, N. J., a corporation of New Jersey No Drawing. Application March 27, 1951,
Serial No. 217,894

9 Claims. (Cl. 204—159)

This invention relates to a process for preparing vitamin B$_{12}$ analogs from vitamin B$_{12}$. More particularly, the invention relates to an improved procedure for preparing vitamin B$_{12}$ analogs by subjecting an acidic solution of vitamin B$_{12}$ to irradiation.

Various procedures have previously been disclosed for preparing analogs of vitamin B$_{12}$. One of such procedures involves hydrogenating vitamin B$_{12}$ as disclosed in the J. A. C. S., 71, 1514, to form vitamin B$_{12a}$, the hydroxide analog. The vitamin B$_{12a}$, in turn, can be converted to other analogs by chemical reactions which introduce the desired anion in place of the hydroxide group of vitamin B$_{12a}$. Another such procedure involves treating vitamin B$_{12}$ with a chemical reducing agent such as sulfurous acid or hydrogen sulfide as disclosed in Science, 112, 354, effecting the substitution of a different anion for the characteristic CN group of vitamin B$_{12}$. Analogs of vitamin B$_{12}$ obtained in such chemical reduction procedures are generally convertible to other desired analogs only with difficulty, if at all.

Both the hydrogenation and chemical reduction procedures above-mentioned are difficult to control and carry to completion, and in carrying out these procedures, the yields are generally rather low due to incompletion of the reaction and partial decomposition of the vitamin B$_{12}$.

We have now discovered a new and improved procedure for preparing analogs of vitamin B$_{12}$ from vitamin B$_{12}$ which is simple and easy to control, which effects a quantitative conversion of vitamin B$_{12}$ to an analog thereof, and which can be employed to produce selectively any of a large number of analogs uncontaminated with other analogs of vitamin B$_{12}$.

Regarded in certain of its broader aspects, our invention comprises irradiating an acidic solution of vitamin B$_{12}$ with light within the ultra-violet and visible range, thereby replacing the characteristic CN group of vitamin B$_{12}$ with the anion present in said acidic solution, and concomitantly removing the liberated CN group from the solution, preferably in the form of gaseous hydrogen cyanide. In order to obtain a quantitative removal of cyanide as hydrogen cyanide and a corresponding quantitative conversion of vitamin B$_{12}$ to an analog, it is preferable to employ in the reaction a molar excess of acid, and we have found in this connection that the use of two moles or more of acid per mole of vitamin B$_{12}$ gives most satisfactory results. The removal of gaseous hydrogen cyanide is also facilitated by passing an inert gas such as air or nitrogen through the solution during irradiation thereof.

The reaction can be carried out with both inorganic and organic acids to form vitamin B$_{12}$ analogs containing the characteristic anion of the particular acid employed. By way of illustration, irradiation of a source of vitamin B$_{12}$ acidified with sulfuric acid effects substantially quantitative conversion of vitamin B$_{12}$ to a sulfate analog thereof, while irradiation of a solution acidified with hydrochloric acid effects a substantially quantitative conversion to a chloride analog of vitamin B$_{12}$. Similarly, other analogs are produced by irradiation in the presence of other acids, including inter alia oxalic, acetic, nitric, citric, and hydrobromic acids.

While vitamin B$_{12a}$, the hydroxide analog, cannot be directly prepared by an irradiation process, certain of the analogs produced can readily be converted to vitamin B$_{12a}$. We have found, for example, that upon treatment of a chloride analog obtained by the irradiation procedure with silver oxide, the chloride is removed as insoluble silver chloride, forming the hydroxide analog of vitamin B$_{12}$.

Many different sources of light can be employed as a means for irradiating the reaction mixture. From a theoretical consideration, it might appear that monochromatic light having a wave length of 361 m$\mu$ would be preferable since the highest light absorption by vitamin B$_{12}$ is obtained at this wave length. It is found in practice, however, that the specific liberation of cyanide is achieved by irradiation with light throughout the ultra-violet and visible range, i. e., with light having a wave length within the range of about 250–750 m$\mu$.

Typical light sources which among others are effective for releasing the CN group of vitamin B$_{12}$ are sunlight, 175 watt sun lamp, ultra-violet light of 260–280 m$\mu$ wave length, visible light (even when light of less than 400 m$\mu$ wave length is excluded), mercury arc light, and monochromatic light of 540 m$\mu$ and 364 m$\mu$ wave lengths. The use of 500 watt reflector type lamps furnishing light of 400–750 m$\mu$ wave length is preferred for ease of operation and economy.

The reactions are preferably carried out at room temperature since at higher temperatures, reduction of vitamin B$_{12}$ is accelerated when reducing impurities are present, and at lower temperatures, the rate of removal of hydrogen cyanide decreases. Since the preferred light source generates considerable heat, it is, therefore, preferable to provide suitable means for cooling the reaction mixture during irradiation. Such cooling can readily be effected by use of circulating water.

It will be understood that when our irradiation process is carried out using substantially pure vitamin B$_{12}$, the analog formed in the process is obtained in the same order of purity. The analog can readily be recovered from the resulting solution in accordance with known procedures, as for example, by precipitation with acetone. The process, however, is not applicable merely to the treatment of pure vitamin B$_{12}$ but can be employed with various vitamin B$_{12}$ concentrates containing substantial amounts of impurities.

The time of irradiation required to release the cyanide and effect a conversion of vitamin B$_{12}$ to an analog thereof depends upon a number of factors, the more important of which include vitamin B$_{12}$ concentration, the color, turbidity, and acid content of the solution irradiated, and the light source employed. By way of illustration, if a 25 cc. clear aqueous solution containing 15 mcg. of pure vitamin B$_{12}$ is irradiated for about 6–8 minutes by two 500 reflector type lamps, furnishing light of 400–750 m$\mu$ wave length, placed at a distance of 1–2" from the solution and with the system completely enclosed in reflectors, cyanide is completely released and irradiation for a longer period of time has no further effect. With solutions having an amber color, all other conditions being the same, the minimum time of irradiation is about two to three times as long or about 15 to 20 minutes. When the irradiated solution is deep brown in color as is frequently the case with liver concentrates containing vitamin B$_{12}$, a still longer period of irradiation, i. e., 20 to 35 minutes, under otherwise identical conditions is required to release all the cyanide. Similarly, the time of irradiation must be prolonged if larger amounts of vitamin B$_{12}$ in higher concentrations are irradiated as illustrated in Example 1.

The course of the reaction may be followed by measuring the amount of hydrogen cyanide removed in the gas stream and calculating the percent removal of cyanide (or conversion of vitamin B$_{12}$ to an analog thereof) using the values 1370 (approximate) for the molecular weight of vitamin B$_{12}$ and 1.9% for the cyanide content of vitamin B$_{12}$. The cessation of hydrogen cyanide evolution signifies the end of the reaction, and assuming that proper conditions have been employed and, in particular, that the proper acidic conditions have been maintained throughout the reaction, cessation of hydrogen cyanide evolution indicates that the vitamin B$_{12}$ present has been completely converted to an analog thereof.

The following examples will show how procedures in accordance with the present invention can be carried out, but it is to be understood that these examples are given by way of illustration and not of limitation.

*Example 1*

300 mg. of vitamin B$_{12}$ crystals assaying 90.4% vitamin $B_{12}$ by ultra-violet absorption at 361 m$\mu$ and having 9.4% moisture, was placed in 20 ml. of aqueous 0.0115 N HCl. The solution was irradiated for 46 hours at room temperature using two 500 watt reflector type lamps of the light wave length range 400–750 m$\mu$ as the light source. As HCN measurement indicated that the conversion of vitamin $B_{12}$ was incomplete, 0.2 ml. of aqueous 1 N HCl was added and irradiation continued for an additional 17.5 hours. Circulating water was used to maintain the irradiated solution at room temperature. During irradiation, a nitrogen stream of 500 ml./min. was passed through the irradiated solution to remove the liberated HCN.

The HCN was collected in traps containing aqueous sodium hydroxide. When irradiation was complete, $NaH_2PO_4$ was added to the contents of the traps, to adjust the pH to 6–7. The CN content was then measured colorimetrically, following the procedure reported in Arch. Biochem., 30, 372, 382 (1951). Calculations based on the CN present indicated that about 100% of the CN originally present in the vitamin $B_{12}$ had been removed.

To the irradiated and aerated solution was added 8 volumes of acetone. The crystals that formed were separated by decantation, washed with 9:1 acetone-water and dried in a desiccator. A quantitative yield of a vitamin $B_{12}$ chloride analog was obtained. The absorption spectrum in aqueous 0.1 N HCl showed principal maxima at about 2730 Å., 3500 Å., 5230 Å. Chloride: calculated for one atom of chlorine and a molecular weight of 1380, 2.57%; found 2.46%.

103.0 mg. of the vitamin $B_{12}$ chloride analog was dissolved in 10 ml. of $H_2O$ and 40 mg. of $Ag_2O$ added. The solution was shaken for 1½ hours and then filtered through asbestos on fine sintered glass. Eight volumes of acetone was added to the filtrate. After standing overnight, the crystals were collected, washed with acetone and dried in vacuum over $P_2O_5$. Vitamin $B_{12a}$ was obtained in good yield. The absorption spectrum in aqueous solution at natural pH showed principal maxima at about 2750 Å., 3500 Å., and 5250 Å. Refractive indices: $\alpha$, 1.580; $\beta$, 1.640; $\gamma$, 1.654.

*Example 2*

300 mg. of vitamin $B_{12}$ crystals, assaying 90.4% vitamin $B_{12}$ by ultra-violet absorption at 361 m$\mu$ and 9.4% moisture, was placed in 20 ml. of aqueous 0.023 N $H_2SO_4$. (The procedure was the same as in Example 1 except that irradiation was limited to 46 hours.) A quantitative yield of a crystalline vitamin $B_{12}$ sulfate analog was obtained. The absorption spectrum in aqueous 0.1 N $H_2SO_4$ showed principal mixima at about 2730 Å., 3500 Å., and 5230 Å. Refractive indices: $\alpha$, 1.560; $\beta$, 1.602; $\gamma$, 1.640.

*Example 3*

The change in extinction coefficients and absorption maxima on irradiation of vitamin $B_{12}$ in sulfuric acid solution was studied. A solution containing 100 mcg. of vitamin $B_{12}$ per ml. of 0.01 N sulfuric acid was irradiated for one hour under the conditions described in Example 1, and the hydrogen cyanide formed was removed by aeration with nitrogen.

| Before Irradiation | | | After Irradiation | | |
|---|---|---|---|---|---|
| Wavelength, Å. | $E^{1\%}_{1\,cm.}$ | | Wavelength, Å. | $E^{1\%}_{1\,cm.}$ | |
| | Observed | Reported for vitamin $B_{12}$[1] | | Observed | Sulfate Analog[2] |
| 2,780 | 115 | 115 | 2,730 | 135 | 135 |
| 3,610 | 206 | 204 | 3,520 | 164 | 163 |
| 5,500 | 63 | 63 | 5,250 | 56 | 55 |

[1] Brink et al.: J. A. C. S. 71, 1854 (1950).
[2] Prepared by another method.

The conversion of vitamin $B_{12}$ to analogs of vitamin $B_{12}$ has many practical applications including not only the preparation of individual analogs uncontaminated by other analogs or by vitamin $B_{12}$ itself, but also as an aid in recovering the vitamin $B_{12}$ active materials from relatively crude concentrates. Even when the starting material employed is pure vitamin $B_{12}$ the process, providing a quantitative conversion to an individual vitamin $B_{12}$ analog, is distinctly advantageous as a step in the preparation of radioactive vitamin $B_{12}$ for use in clinical tracer studies. An analog prepared from pure vitamin $B_{12}$ can be quantitatively converted to radioactive vitamin $B_{12}$ by reaction with an ionizable cyanide compound wherein the CN group contains a radioactive form of carbon.

Various changes and modifications in the foregoing procedures will occur to those skilled in the art, and to the extent that such changes and modifications are embraced by the appended claims, it is to be understood that they constitute part of our invention.

We claim:

1. The process that comprises adding to an aqueous solution containing vitamin $B_{12}$ a quantity of acid in molar excess of the amount of vitamin $B_{12}$ present, and subjecting the acidified solution to irradiation by light within the ultra-violet and visible range while passing an inert gas through the solution to remove the hydrogen cyanide thus formed, and continuing the irradiation until no further hydrogen cyanide is evolved, thereby effecting a substantially quantitative conversion of the vitamin $B_{12}$ to an analog containing, in place of the CN group, the anion present in said acid.

2. The process that comprises reacting vitamin $B_{12}$ in aqueous solution with a molar excess of an acid while irradiating the reaction mixture with light having a wave length within the range of about 250–750 m$\mu$ and continuously removing from said solution the hydrogen cyanide which is formed, thereby effecting a displacement of the CN group of vitamin $B_{12}$ and forming an analog of vitamin $B_{12}$ having the anion present in said acid.

3. The process as defined in claim 2 wherein vitamin $B_{12}$ is reacted with hydrochloric acid thereby forming a chloride analog of vitamin $B_{12}$.

4. The process as defined in claim 2 wherein vitamin $B_{12}$ is reacted with sulfuric acid thereby forming a sulfate analog of vitamin $B_{12}$.

5. The process that comprises irradiating a solution of vitamin $B_{12}$ containing an acid in molar excess of the vitamin $B_{12}$ present with light within the ultra-violet and visible range and concomitantly removing from said solution the hydrogen cyanide which is formed, thereby effecting a displacement of the CN group in vitamin $B_{12}$, and formation of a vitamin $B_{12}$ analog containing, in place of the CN group, the anion supplied by the acid in said solution.

6. The process that comprises irradiating a solution of vitamin $B_{12}$ containing an acid in molar excess of the vitamin $B_{12}$ present with light within the ultra-violet and visible range and concomitantly aerating the solution to remove from said solution the hydrogen cyanide which is formed, thereby effecting a displacement of the CN group in vitamin $B_{12}$, and formation of a vitamin $B_{12}$ analog containing, in place of the CN group, the anion supplied by the acid in said solution.

7. The process that comprises irradiating a solution of vitamin $B_{12}$ containing an acid in molar excess of the vitamin $B_{12}$ present with light having a wave length within the range of about 250 to 750 m$\mu$, and concomitantly removing from said solution the hydrogen cyanide which is formed, thereby effecting a displacement of the CN group in vitamin $B_{12}$, and formation of a vitamin $B_{12}$ analog containing, in place of the CN group, the anion supplied by the acid in said solution.

8. The process that comprises irradiating a solution of vitamin $B_{12}$ containing an acid in molar excess of the vitamin $B_{12}$ present with light having a wave length within the range of about 250 to 400 m$\mu$, and concomitantly removing from said solution the hydrogen cyanide which is formed, thereby effecting a displacement of the CN group in vitamin $B_{12}$, and formation of a vitamin $B_{12}$ analog containing, in place of the CN group, the anion supplied by the acid in said solution.

9. The process that comprises irradiating a solution of vitamin $B_{12}$ containing a quantity of acid in molar excess of the vitamin $B_{12}$ present with light within the ultra-violet and visible range while passing an inert gas through the solution to remove the hydrogen cyanide thus formed, thereby effecting a displacement of the CN group in vitamin $B_{12}$, and formation of a vitamin $B_{12}$ analog containing, in place of the CN group, the anion supplied by the acid in said solution.

References Cited in the file of this patent

UNITED STATES PATENTS

| Number | Name | Date |
|---|---|---|
| 2,566,123 | De Rose | Aug. 28, 1951 |

OTHER REFERENCES

Nature, April 24, 1948, p. 638.
Ellis et al.: Chemical Action of Ultraviolet Rays (1941), pp. 850–856.
Veer et al.: Biochimica et Biophysica Acta, vol. 6 (September 1950), pp. 225–227.